United States Patent
Oscar et al.

(10) Patent No.: US 11,705,697 B2
(45) Date of Patent: Jul. 18, 2023

(54) CONNECTION JOINT FOR CABLES FOR A CABLE STRINGING PLANT

(71) Applicant: TESMEC S.P.A., Milan (IT)

(72) Inventors: Alberto Oscar, Castro (IT); Stefano Osio, Treviolo (IT); Fabrizio Parodi, Presezzo (IT)

(73) Assignee: TESMEC S.P.A., Milan (IT)

( * ) Notice: Subject to any disclaimer, the term of this patent is extended or adjusted under 35 U.S.C. 154(b) by 284 days.

(21) Appl. No.: 17/278,728

(22) PCT Filed: Sep. 25, 2019

(86) PCT No.: PCT/IT2019/050211
§ 371 (c)(1),
(2) Date: Mar. 23, 2021

(87) PCT Pub. No.: WO2020/070764
PCT Pub. Date: Apr. 9, 2020

(65) Prior Publication Data
US 2022/0037864 A1    Feb. 3, 2022

(30) Foreign Application Priority Data
Oct. 5, 2018  (IT) .......... 102018000009196

(51) Int. Cl.
*F16G 11/09*    (2006.01)
*H02G 7/18*    (2006.01)
(Continued)

(52) U.S. Cl.
CPC .............. *H02G 1/04* (2013.01); *F16G 11/09* (2013.01); *H02G 1/081* (2013.01); *H02G 1/083* (2013.01);
(Continued)

(58) Field of Classification Search
CPC .......... F16G 11/025; F16G 11/09; H02G 7/00; H02G 7/20; H02G 7/18
See application file for complete search history.

(56) References Cited

U.S. PATENT DOCUMENTS 1,866,470 A * 7/1932 Hellmuth .............. F16G 11/048
  403/72
3,136,844 A   6/1964 Petersen
2008/0246010 A1 10/2008 Barthold

FOREIGN PATENT DOCUMENTS

EP    0369411 A1    5/1990
EP    1953882 A1    8/2008
(Continued)

*Primary Examiner* — Tyrone V Hall, Jr.
(74) *Attorney, Agent, or Firm* — BakerHostetler

(57) ABSTRACT

Connection joint for cables for a cable stringing plant, comprising at least one first tubular element (18) to which a first segment (22) of a flexible member (19) is attached and positioned rotatable, at least with respect to a longitudinal axis (L) of the joint, inside a second tubular element (23) open at a first end and closed at the other end by a bottom wall (25); the bottom wall (25) comprises at least one hole (26) from which a second segment (27) of the flexible member (19) emerges; the second segment (27) is attached to a portion (32) of a third tubular element (31); the second and third tubular elements (23, 31) are provided on opposite ends with a corresponding hole (29, 35) directed substantially in a longitudinal direction and able to house a respective segment of cable (11a, 11b) to be laid.

12 Claims, 2 Drawing Sheets

(51) Int. Cl.
 *H02G 1/04* (2006.01)
 *H02G 1/08* (2006.01)
 *H02G 1/14* (2006.01)
 *H02G 15/18* (2006.01)
(52) U.S. Cl.
 CPC ............... *H02G 1/14* (2013.01); *H02G 7/18* (2013.01); *H02G 15/18* (2013.01)

(56) References Cited

FOREIGN PATENT DOCUMENTS

FR 1260807 A 5/1961
WO 2018085520 A1 5/2018

\* cited by examiner

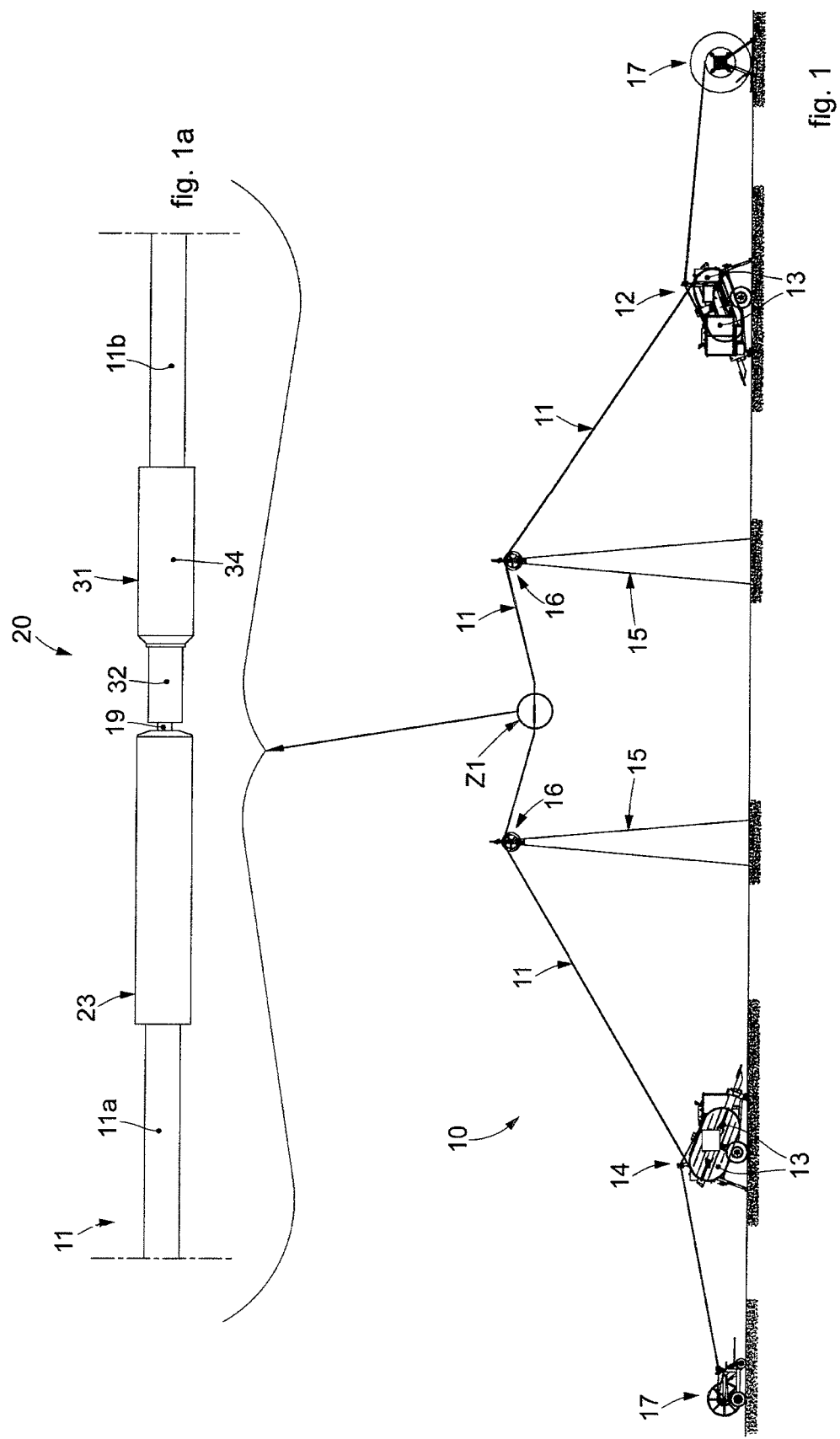

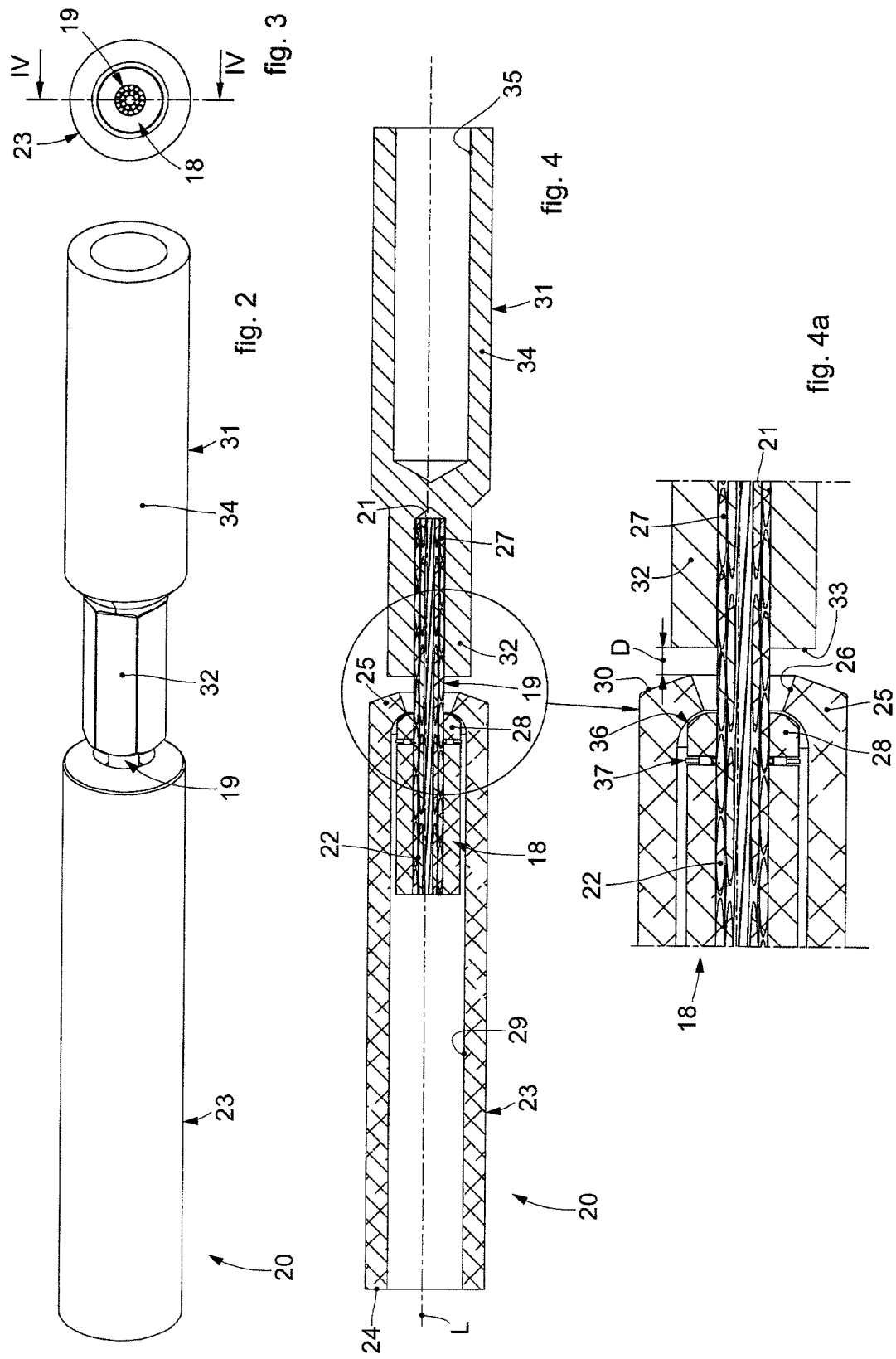

CONNECTION JOINT FOR CABLES FOR A CABLE STRINGING PLANT

CROSS-REFERENCE TO RELATED APPLICATIONS

This application is the National Stage of International Patent Application No. PCT/IT2019/050211, filed Sep. 25, 2019, which claims priority to Italian Application No. 102018000009196, filed Oct. 5, 2018, the disclosures of which are incorporated herein by reference in their entirety.

FIELD OF THE INVENTION

The present invention concerns a connection joint for cables, such as for example electrical conductors, cables, optical fibers, or suchlike, for a cable stringing plant.

The present invention also concerns a method to produce such a connection joint for cables and also a cable stringing plant comprising the joint.

In particular, the present invention concerns a joint which can be used in a plant to string, for example, a high voltage overhead electric line and in general overhead lines which provide the so-called "braked" stringing of the cables, that is, the overhead conductors.

BACKGROUND OF THE INVENTION

In plants for tensioning overhead lines, the current method to replace overhead conductors, that is, the so-called reconductoring, provides the following operations:

- positioning of the pulleys for stringing the conductor on the supports that make up the segment of the line on which the conductor is being replaced;
- connection of the new conductor or of a pulling cable to the existing conductor;
- recovery of the old conductor by means of a winch-brake, storing the old conductor on empty reels previously prepared at the winch station;
- simultaneous release of the new conductor from the reel on which it is wound by using a brake (or a winch-brake) at the brake station, in order to allow the "braked" tensioning of the new conductor;
- subsequent collection of the reels of old conductor and transport to a recycling and disposal center, where the old conductor is broken down and divided according to the materials it is made of.

The high voltage overhead transmission lines can consist of single conductors (one per phase), but more typically they consist of multiple conductors for each phase, ranging from 2 to 6, but also with a tendency to increase up to 8 or 10 conductors.

The brake and winch stations are located at opposite ends of a section of the line on which the conductor is being replaced.

The winch station where the old conductor is recovered can consist of a winch-brake machine for the recovery of the old conductor and a number of reel-stands equal to the number of conductors that make up each single phase of the line. The empty reels which will collect the "old" conductor will then be installed on the stands, and the "old" conductor will then be disposed of in suitable recycling centers.

The brake station where the unwinding and tensioning of the new conductor occurs, or of a pulling cable to be used subsequently for the tensioning of new conductors, normally consist of a brake or winch-brake machine and a number of reel-stands equal to the number of conductors that make up each single phase of the line.

The size of the winch and brake stations is proportional to the number of stands on which the individual reels have to be housed.

The brake winches for the recovery of the existing conductor normally consist of a pair of capstans for each conductor, provided with a diameter 35 times the diameter of the conductor to be recovered.

Normally, the conductors that make up the high voltage lines have multiple interruptions along their length, essentially due to the presence of fixed joints in the span, the so-called "mid-span joints". These have the function of connecting the two ends of the conductors in the event of a reel change, or when a reel of new conductor finishes, and the subsequent reel begins.

Generally, the joints consist of straight tubular cores in aluminum and/or steel with a length that varies between 500 mm to 2000 mm.

The joints cannot pass over the capstans, since they would break due to the flexion caused by the winding onto the circular surface, with the consequent catastrophic fall of the tensioned line.

For this reason, current reconductoring operations are subject to innumerable interruptions in the process; in essence, when a joint reaches the winch machine, it is necessary to proceed as follows:

- stop the winch machine when the joint is in proximity to the capstans;
- clamp the end of the conductor upstream of the joint with clamps suitable to maintain the pull on the line;
- release the pull of the other end of the winch-side conductor;
- cut and remove the joint in question;
- replace the cut joint with a flexible joint, for example a sock joint;
- resume the pull of the line with the winch machine;
- remove the clamp that held the upstream end of the line;
- resume the reconductoring operations until the sock joint exits the winch machine and appears on the recovery reels of the old conductor;
- stop the winch machine again;
- clamp the end of the winch-side conductor with clamps suitable to maintain the pull on the line;
- release the pull of the other end of the reel-side conductor;
- remove the sock joint and clamp the end of the conductor onto the recovery reel;
- resume the pull of the line with the winch machine;
- remove the clamp that held the upstream end of the line;
- resume the reconductoring operations until a new joint reaches the winch machine or until the recovery reel of the old conductor is full and has to therefore be replaced.

Normally, the line for which the conductors are being replaced has variable lengths, but typically is divided into single operative segments, the length of which can vary from 3 to 6 km, as a function of the morphological characteristics of the line and the orographic conditions of the terrain.

Within these sections there can be tension supports, typically in correspondence with high angles or special conditions such as critical crossings or other, where the conductor is anchored in a horizontal direction and the electric continuity is guaranteed with bypass segments; in the event the tension support does not coincide with the beginning or end of the segment, the so-called through anchor is made, that is, the by-pass is connected to the two branches of the conductor of the line with two end sock joints connected to a swivel joint, or to double sock joints. When these sections reach the winch machine it is necessary to proceed with the interruption in front of the winch in order to remove the possible swivel joint, and with a second interruption after the passage on the winch in order to remove and recover the sock joints, which are intended for multiple use and are not intended for scrap, with a sequence very similar to that described above for fixed mid-span joints.

Moreover, the process is interrupted whenever the new conductor present at the brake station runs out, and therefore it is necessary to replace the reel of new conductor, or when the reel of old conductor is filled at the winch station and an empty reel therefore has to be installed.

Finally, it should be added that the sizes and stiffness of the fixed mid-span joints are such that they often do not allow their passage even in the stringing pulleys, without the risk of deformation and/or breakage; in the event the conditions of the joint do not guarantee the necessary safety coefficients for the reconductoring operation, the joint itself has to be replaced with a temporary connection made as described above with sock joints, with the same operative sequence.

Alternatively, so-called "Joint Protectors" can be used, consisting of steel tubular elements divided into two halves, which completely cover the joint itself and protect it during stringing operations; in any case these devices have to also be installed before or during the stringing and have to be removed when they reach the winch station.

A system to recover conductors is also known from the state of the art, which replaces the traditional winch machine with a so-called continuous pulling system, see for example the Italian patent application number 102016000021986 in the name of the Applicant, able to achieve a continuous stringing eliminating the need to stop the pulling operation when the fixed mid-span joints, or the temporary joints (by-pass) reach the winch machine.

However, traditional joints, such as sock and/or swivel joints, cannot be used in this system unless at the risk of damaging some components of the combined recovery and recycle machine, and they have to therefore be recovered during work operations, requiring a series of stops to load the pull line, remove the components, allow the machine to recover the free end of the pull-side conductor and continue with the recovery operation, which would eliminate a significant part of the savings offered by the continuous stringing plant in terms of execution time.

Further examples of known cable joints or connection devices are described in documents FR-A-1260807, EP-A-1953882, EP-A-0369411, WO-A-2018/085520 and U.S. Pat. No. 3,136,844.

Other limitations and disadvantages of conventional solutions and technologies will be clear to a person skilled in the art following the reading of the remaining part of the present description with reference to the drawings and to the description of the following embodiments, although it is intended that the description of the state of the technique related to the present description should not be considered an admission that what is described here is already known from the state of the prior art.

There is therefore a need to perfect a connection joint for cables and therefore a cable stringing plant that can overcome at least one of the disadvantages of the state of the art.

One purpose of the present invention is to provide a stringing joint for cables, in particular a swivel joint, which can provide a greater degree of flexional freedom than current known swivel joints so that for example it allows rapid, efficient and safe reconductoring operations, and furthermore which is equipped with a longitudinal flexibility such as to allow it to adapt to the circular profiles of the stringing plant, such as for example pulleys or stringing rollers, but also traction wheels of pulling systems, reels or other, minimizing the operating overloads associated with traditional swivel joints.

Another purpose of the present invention is to provide a connection joint for cables which, in reconductoring operations, offers the possibility of inserting the old or new conductor on each side for a significantly shorter length than is necessary with traditional joints, for example sock joints.

Another purpose of the present invention is to provide a connection joint for cables which also has a high degree of rotational freedom, similar to or greater than that of current swivel joints.

Another purpose of the present invention is to provide a connection joint for cables which effectively manages to withstand workloads suitable for the work operations and the operations to maintain the minimum safety coefficients provided for the stringing operations.

Another purpose of the present invention is to perfect a rapid and efficient method to produce a connection joint for cables for a cable stringing plant.

Another purpose of the present invention is to provide a cable stringing plant comprising an efficient and flexible connection joint for cables which is highly adaptable to the circular profiles present in the plant, such as for example pulleys, rollers for stringing the cables, but also traction wheels of pulling systems, reels or other.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the invention or variants to the main inventive idea.

In accordance with the above purposes, one purpose of the invention is a connection joint for cables for a cable stringing plant; the joint comprises at least one first tubular element to which a first segment of a flexible member is attached and positioned rotatable, at least with respect to a longitudinal axis of the joint, inside a second tubular element open at a first end and closed at the other end by a bottom wall; the bottom wall comprises at least one hole from which a second segment of the flexible member emerges; the second segment is attached to a portion of a third tubular element; the second and third tubular elements are provided on opposite ends with a corresponding hole directed substantially in a longitudinal direction and able to house a respective segment of cable to be laid.

In some embodiments, a bushing is housed between the first tubular element and the bottom wall of the second tubular element; the bushing has a surface able to rest on a rounded internal part of the bottom wall of the second tubular element; the surface of the bushing has a rounding corresponding to the rounding of the internal part of the bottom wall.

The bushing is preferably separated from said first tubular element, therefore it is a separate component from the first tubular element.

The surface of the bushing can also comprise a hemispherical or similar external profile.

The portion to which the second segment of the flexible member is attached can comprise a polygonal external shape, suitable for example to engage with a clamping tool or suchlike.

A distance comprised between about 5 mm and about 10 mm is left between the end of the portion to which the second segment of the flexible member is attached and the bottom wall of the tubular element, so as to allow the correct flexion of the joint and to not distance the components of the joint excessively. The distance can for example be about 7 mm.

The tubular elements can be attached to the respective segments of the flexible member by compression on the segments of the flexible member.

The segments of cable can be attached in the holes of the tubular elements by compression of the segments of tubular elements.

At least one thrust-bearing member can be positioned between the first tubular element and the bushing.

The tubular elements can for example be aluminum sleeves, so as to be easily and effectively compressed on the flexible member and on the segments of cable.

The flexible member can comprise at least one steel cable or cord, in particular a spiral steel cable or cord, which by its very nature is highly flexible and resistant.

Another purpose of the invention is a method to produce a connection joint for cables for a cable stringing plant, comprising: attaching a first segment of a flexible member to a first tubular element; inserting the first tubular element into a second tubular element, so that the first tubular element is positioned rotatable, at least with respect to a longitudinal axis of the joint, inside the second tubular element; the second tubular element is open at a first end and closed at the other end by a bottom wall; the bottom wall comprises at least one hole from which a second segment of the flexible member emerges; attaching the second segment of the flexible member to a portion of a third tubular element; housing a segment of cable in holes made in a substantially longitudinal direction inside the second and third tubular elements.

In some embodiments, the method provides to house a bushing between the first tubular element and the bottom wall of the second tubular element; the bushing has a surface able to rest on a rounded internal part of the bottom wall of the second tubular element; the surface of the bushing has a rounding corresponding to the rounding of the internal part of the bottom wall.

Another purpose of the invention is a cable stringing plant, provided with at least one winch machine and at least one brake machine positioned on opposite sides with respect to one or more intermediate supports and comprising at least one connection joint for cables as defined above.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

ILLUSTRATION OF THE DRAWINGS

These and other characteristics of the present invention will become apparent from the following description of some embodiments, given as a non-restrictive example with reference to the attached drawings wherein:

FIG. 1 is a schematic view of a cable stringing plant according to the present invention;

FIG. 1a is a view of an enlarged zone of the plant of FIG. 1 in which a connection joint for cables according to the present invention is schematically shown;

FIG. 2 is a three-dimensional view of the present joint;

FIG. 3 is a view of the present joint seen from one end;

FIG. 4 is a longitudinal section view of the present joint according to line IV-IV of FIG. 3;

FIG. 4a is a view of an enlarged zone of the joint of FIG. 4.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

With reference to the attached drawings, FIG. 1 schematically shows a stringing plant 10, according to the present invention, configured to string one or more cables 11, that is, for example, one or more electrical conductors of a high voltage overhead electric line. In FIG. 1, as a non-limiting example, a cable 11 is schematically shown.

The stringing plant 10 comprises, to string the cable 11, at least one brake machine 12 and at least one winch machine 14, each of these provided with one or more winding or unwinding members, or capstans 13.

The brake machine 12 and the winch machine 14 could also be of the winch-brake type, that is, combined in order to selectively perform both the winch function and also the brake function.

At least one brake machine 12 and at least one winch machine 14 are positioned on opposite sides with respect to intermediate supports 15, for example pylons, on which the cables 11 are strung. In the event machines of the winch-brake type are used, at least one winch-brake machine will be positioned on each side with respect to the intermediate supports.

On these intermediate supports 15, as can be observed, the cable 11 is strung on a pulley 16, or a roller, on which, as is known, the cable 11 will be subjected to a certain curvature.

The cable 11 is fed to the stringing plant by means of at least one reel 17 disposed upstream of a brake machine 12 and is recovered downstream of the winch machine 14 on a reel 17.

A joint 20 is schematically shown along the cable 11, for example in the zone Z1, able to connect two segments of cable 11a and 11b, see the enlargement of the zone Z1 of FIG. 1a.

The joint 20, see also the views of FIG. 2, FIG. 3 and FIG. 4, comprises a tubular element 18, for example a sleeve, to which a segment 22 of a flexible member 19 is attached.

The flexible member 19 can be a steel cable or cord, in particular a spiral steel cable or cord, which by its very nature is flexible, therefore guarantees great flexibility to the present joint 20.

The tubular element 18 can be for example an aluminum sleeve. The segment 22 of the flexible member 19 can be inserted inside the tubular element 18 and the tubular element 18 can be compressed, in a known manner, in order to firmly enclose the segment 22 of the flexible member 19, using for example one of the traditional methods to compress mid-span joint for stringing plants.

The tubular element 18 with the segment 22 of the flexible member 19 attached is introduced into another tubular element 23, which is open at one end 24 and at the opposite end comprises a bottom wall 25 in which a hole 26 is made, see also FIG. 4a.

The hole 26 has a diameter such as to allow the passage of an open segment 27 of the flexible member 19.

The bottom wall 25 is preferably rounded at least toward the inside of the tubular element 23 and a bushing 28 rests thereon, housed between the bottom wall 25 and the tubular element 18.

The bushing 28 is therefore preferably an element isolated and separated from the tubular element 18 and, of course, from the tubular element 23. This allows an even greater adaptability of the flexion movements of the joint 20 in the different situations in which it can be used.

The positioning of a thrust-bearing member 37 can be provided between the bushing 28 and the tubular element 18, such as for example a thrust bearing or a bushing made of bronze or polymeric material.

The bushing 28 can be made for example of polymeric material.

The bushing 28 also has a surface 36 which rests against the rounded internal part of the bottom wall 25 of the tubular element 23; this surface 36 of the bushing 28 has a rounding corresponding to the rounding of the bottom wall 25, so as to allow a minimum flexion movement between the tubular element 18 and the tubular element 23. For example, the surface 36 of the bushing 28 can have a semispherical or similar external profile, in order to obtain an effective and optimal distribution of the forces at play during the flexion movements of the joint 20.

The hole 26 preferably has an internal diameter which is greater than the external diameter of the flexible member 19, in order to facilitate the flexion of the flexible member.

The hole 26 can be defined by a cylindrical surface diverging from the inside toward the outside of the tubular element 18, as shown in FIG. 4 and FIG. 4a, in order to facilitate the flexion of the flexible member 19.

The tubular element 18 is mounted rotatable inside the tubular element 23, which has a hole 29 directed longitudinally, that is, along the longitudinal axis L, in particular the tubular element 18 is free to rotate with respect to the longitudinal axis L of the joint 20.

In particular, the tubular element 18 has a cylindrical external surface which is inserted into the cylindrical hole 29 of the tubular element 23.

The hole 29 of the tubular element 23 is partly occupied by the tubular element 18 and has at least one free portion, so as to allow the insertion of a segment of cable, for example the segment of cable 11a.

The external surface 30 of the tubular element 23 located in correspondence with the hole 26 from which the flexible member 19 exits can also have a rounded shape.

Another tubular element 31 is attached on the free segment 27 of the flexible member 19 which protrudes out of the tubular element 23 through the hole 26.

The tubular element 31 comprises a first portion 32 provided with a hole 21 inside which the segment 27 of the flexible member 19 is introduced.

The tubular element 31 can be an aluminum sleeve. The attachment of the segment 27 of the flexible member 19 to the portion 32 can occur in a manner similar to that mentioned previously, by means of known techniques to compress the portion 32.

The portion 32 which houses the portion 27 of the flexible member 19 can have, after compression, a polygonal external shape, for example hexagonal, as can be seen in FIG. 2.

A certain distance D can be left between the end 33 of the portion 32 and the bottom wall 25 of the tubular element 23, so as to allow the correct flexion of the joint 20. The distance D is comprised between about 5 mm and about 10 mm, so as to allow the correct flexion of the joint and to not excessively distance the components of the joint. The distance can be for example equal to about 7 mm. However, if the bottom wall 25 comprises a rounded external surface 30, it would be possible to provide a corresponding rounding of the end 33 of the portion 32, so as to still allow the correct flexion of the joint 20.

The tubular element 31 comprises another portion 34 provided with a hole 35, directed longitudinally, inside which a segment of cable can be inserted, for example the segment of cable 11b.

The tubular elements 23 and 31 can be aluminum sleeves. The attachment of the segments of cable 11a and 11b respectively in the hole 29 of the tubular element 23 and in the hole 35 of the tubular element 31 can occur by means of a compression operation performed with the traditional compression methods of mid-span joints, that is, by compression of the tubular elements 23 and 31 on the segments of cable 11a, 11b.

Preferably, the tubular elements 23 and 31 are rectilinear and at least initially and at rest are directed along the longitudinal axis L of the joint 20.

In summary, the present connection joint 20 for cables, equipped with a flexible member 19 and tubular elements 23 and 31 to which to connect the segments of cable 11a and 11b, is provided with the flexibility necessary to follow in a spontaneous manner the circular profiles present in the stringing plant 10, for example the profile of the stringing pulleys, compatibly with the sizes of the joint itself and with the size of the diameter of the bottom of the throat of the pulley.

Obviously, the present connection joint 20 also lends itself to be used with devices different from the traditional stringing pulleys, such as stringing rollers or other specific tools, for example traction wheels, reels or other.

By means of the present joint 20, moreover, it is possible to obtain a definite containment of the working length of the joint in correspondence with the connection to the end of the cable. Traditional sock joints have a usable working length equal to about 50-80 times the diameter of the cable, while the present joint 20, if the tubular elements 18 and 31 are attached by compression to the flexible member 19, provides a usable compression length equal to about 5-10 times the diameter of the conductor, compatibly with the loads required.

Another aspect of the present joint 20 is that it is temporary, that is, it is a single-use disposable joint: the characteristic of being disposable is possible thanks to the type of construction, that is, the attachment of the flexible member 19 to the tubular elements 18 and 31 occurs by compression of the tubular elements 18 and 31 on respective segments 22 and 27 of the flexible member 19. This characteristic is further obtained by the attachment of the segments of cable 11a and 11b to the respective tubular elements 23 and 31 by compression of the tubular elements 23 and 31 on the sections of cable 11a and 11b.

The present joint 20 therefore proves to be completely compatible with the operative method of the innovative continuous pulling system cited in the Italian patent application number 102016000021986. In contrast, traditional swivel joints, as mentioned in the introduction, cannot be used in this pulling system, in particular traditional swivel joints cannot pass through the system of traction wheels of the continuous pulling unit due to the reduced length, which does not guarantee a simultaneous grip of at least two traction wheels. Even traditional sock joints cannot be used in this pulling system, since they show anomalous behaviors both when passing under the traction wheels, and also in correspondence with the cutting module of the new system, due to the flexibility of the material of which they are made and to the type of weave, which tends to open, creating an obstacle to the flow of the material in the work devices installed in the continuous pulling system.

It is clear that modifications and/or additions of parts may be made to the connection joint for cables as described heretofore, without departing from the field and scope of the present invention.

It is also clear that, although the present invention has been described with reference to some specific examples, a person of skill in the art shall certainly be able to achieve many other equivalent forms of connection joint for cables, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A connection joint for cables for a cable stringing plant, the connection joint comprising:
    at least one first tubular element (18) to which a first segment (22) of a flexible member (19) is attached and positioned rotatable, at least with respect to a longitudinal axis (L) of the joint, inside a second tubular element (23) open at a first end and closed at an other end by a bottom wall (25), said bottom wall (25) comprising at least one hole (26) from which a second segment (27) of said flexible member (19) emerges, said second segment (27) being attached to a portion (32) of a third tubular element (31), said second and third tubular elements (23, 31) being provided on opposite ends with a corresponding hole (29, 35) directed substantially in a longitudinal direction and able to house a respective segment of cable (11a, 11b) to be laid, a bushing (28) is housed between said first tubular element (18) and said bottom wall (25) of the second tubular element (23), said bushing (28) having a surface (36) able to rest on a rounded internal part of the bottom wall (25) of the second tubular element (23), said surface (36) of said bushing (28) having a rounding corresponding to the rounding of the internal part of the bottom wall (25).

2. The joint as in claim 1, wherein said bushing (28) is a separate component from said first tubular element (18).

3. The joint as in claim 1 wherein said surface (36) of said bushing (28) comprises a hemispherical external profile or similar.

4. The joint as in claim 1, wherein said portion (32) to which said second segment (27) of the flexible member (19) is attached, comprises a polygonal external shape.

5. The joint as in claim 1, wherein a distance (D) comprised between about 5 mm and about 10 mm is left between the end (33) of said portion (32) to which said second segment (27) of the flexible member (19) is attached and the bottom wall (25) of the tubular element (23), so as to allow the correct flexion of the joint (20).

6. The joint as in claim 1, wherein said tubular elements (18, 31) are attached to the respective segments (22, 27) of the flexible member (19) by compression on said segments (22, 27) of the flexible member (19).

7. The joint as in claim 1, wherein said segments of cable (11a, 11b) are attached in said holes (29, 35) of said tubular elements (23, 31) by compression of said tubular elements (23, 31) on said segments of cable (11a, 11b).

8. The joint as in claim 1, wherein at least one thrust-bearing member (37) is positioned between said first tubular element (18) and said bushing (28).

9. The joint as in claim 1, wherein said tubular elements (18, 23, 31) are aluminum sleeves.

10. The joint as in claim 1, wherein said flexible member (19) comprises at least one steel cable or cord, in particular a spiral steel cable or cord.

11. A method to produce a connection joint for cables for a cable stringing plant, the method comprising:
    attaching a first segment (22) of a flexible member (19) to a first tubular element (18);
    inserting said first tubular element (18) into a second tubular element (23) so that said first tubular element (18) is positioned rotatable, at least with respect to a longitudinal axis (L) of the joint, inside said second tubular element (23), said second tubular element (23) being open at a first end and closed at an other end by a bottom wall (25), said bottom wall (25) comprising at least one hole (26) from which a second segment (27) of said flexible member (19) emerges;
    attaching said second segment (27) of the flexible member (19) to a portion (32) of a third tubular element (31);
    housing a segment of cable in holes (29, 35) made in a substantially longitudinal direction inside said second and third tubular elements (23, 31); and
    housing a bushing (28) between said first tubular element (18) and said bottom wall (25) of the second tubular element (23), said bushing (28) having a surface (36) able to rest on a rounded internal part of the bottom wall (25) of the second tubular element (23), said surface (36) of said bushing (28) having a rounding corresponding to the rounding of the internal part of the bottom wall (25).

12. A cable stringing plant, provided with at least one winch machine (14) and at least one brake machine (12) positioned on opposite sides with respect to one or more intermediate supports (15), said plant comprising at least one cable connection joint (20) as in claim 1.

\* \* \* \* \*